Dec. 16, 1969    J. T. JANSEN    3,483,858
STABILIZED ROTARY SAWING MACHINE
Filed July 31, 1967    2 Sheets-Sheet 1
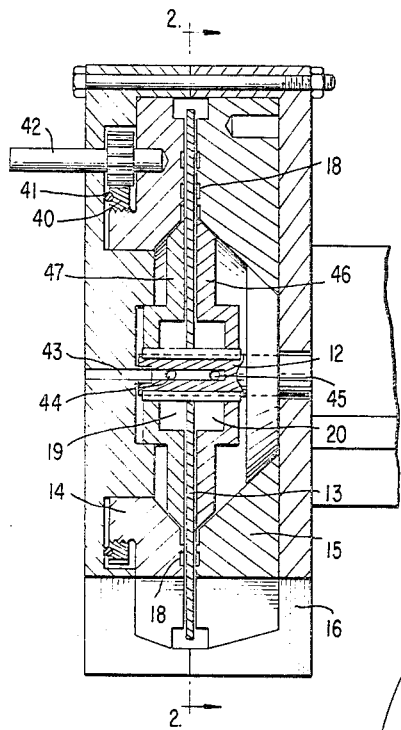
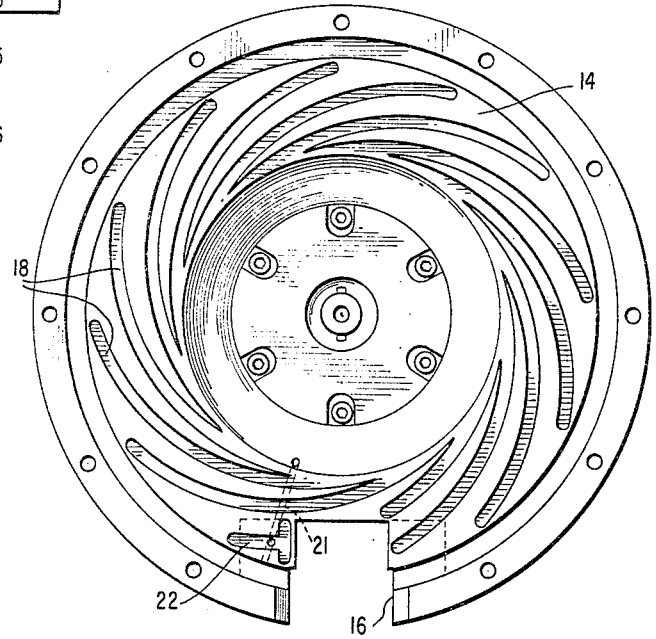
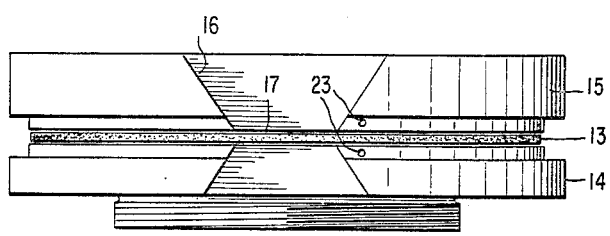
INVENTOR
JOHANNES T. JANSEN
ATTORNEYS Dec. 16, 1969  J. T. JANSEN  3,483,858
STABILIZED ROTARY SAWING MACHINE
Filed July 31, 1967  2 Sheets-Sheet 2

INVENTOR
JOHANNES T. JANSEN

BY *Aughre, Rothwell, Mion, Zinn & Macpeak*

ATTORNEYS

United States Patent Office 3,483,858
Patented Dec. 16, 1969

---

3,483,858
STABILIZED ROTARY SAWING MACHINE
Johannes T. Jansen, Carlisle, Pa., assignor to P. R. Hoffman Company, Carlisle, Pa., a corporation of Delaware
Filed July 31, 1967, Ser. No. 657,101
Int. Cl. B28d 1/04
U.S. Cl. 125—13                                    3 Claims

ABSTRACT OF THE DISCLOSURE

A sawing machine having a thin circular saw blade rotatably mounted between a pair of nonrotatable bearing members which are provided with a plurality of passageways in the faces thereof, to direct lubricants to the saw blade, and which are adapted to restrict the saw blade over the entire surface, except in the area of a radial slot which exposes the saw blade to the workpiece. The blade restriction causes the formation of corrugations in the side faces of the blade in the area of the slot which effectively stiffen the blade in the exposed area when the blade is rotated at high speeds. The result is a straighter, but wider kerf cut in the workpiece.

---

This invention relates to an improved rotary saw for quartz or the like. Quartz wafers used for frequency control in electronic devices are commonly sliced from quartz rock, either natural or synthetic, by rotary saws and then processed by a number of steps including lapping to produce a finished blank with flat parallel faces. Due to the cost of the quartz from which the wafers are cut, it is desirable to cut the quartz rock with a minimum of waste and obtain a maximum number of wafers from a quartz rock.

The rotary saw blades used in cutting quartz, are very thin (for example, .008–.025 inch) copperplated sheet steel with a diamond edge, are adapted to be rotated at speeds in excess of 3,000 r.p.m. Blades presently available will and do warp and flex within a tolerance of ±.002 inch in a parallel plane when the blade is applied to the workpiece. Even in a situation where there is a minimum of blade warpage during cutting, the flexible nature of the blade will cause a canyon-shaped cut to be made in the workpiece. Since it is desirable to obtain a quartz slab of uniform cross-sectional dimensions in the manufacture of quartz crystals, this canyon-shaped cut makes the quartz slabs difficult to lap to provide parallel faces with uniform crystal width and wastes quartz.

A thin saw blade which is completely unrestrained in the cutting plane will take an unpredictable path through the workpiece due to warpage as the blade encounters cutting resistance. When using such a blade, the quartz slabs must initially be cut to a substantially larger dimension so that the slab may be later planed down to conform to the desired dimensions of the final quartz crystal. This results in further waste of large amounts of quartz material.

The problem is somewhat lessened when the saw blade is partially restricted. However, the initial canyon-shaped cut still makes substantial lapping necessary before achieving the desired dimensional characteristics of the final quartz crystals.

According to the present invention, a thin, rotary saw blade is restricted over its entire surface in the cutting plane between a pair of nonrotatable bearings, except in the cutting area where a radial slot which extends through the bearings and the respective frame members exposing the blade to the workpiece. The bearings, in effect, clamp the flexible blade in the area of the slot causing corrugations to be formed on the blade surfaces in the exposed area, which corrugations stiffen the blade. The corrugated, stiffened blade causes a wider, but straighter kerf to be cut in the quartz workpiece, and thus, eliminates the need for a substantial lapping operation. There is, therefore, a more efficient use made of the quartz material.

The features and advantages of the present invention will be apparent from the following description by way of the accompanying drawings in which:

FIGURE 1 is a longitudinal section view of the saw mounting arrangement of the thin circular saw blade.

FIGURE 2 is a lateral section of the sawing machine in the direction of line 2—2 of FIGURE 1.

FIGURE 4 is a bottom view showing the separable frame members removed.

Figure 3:
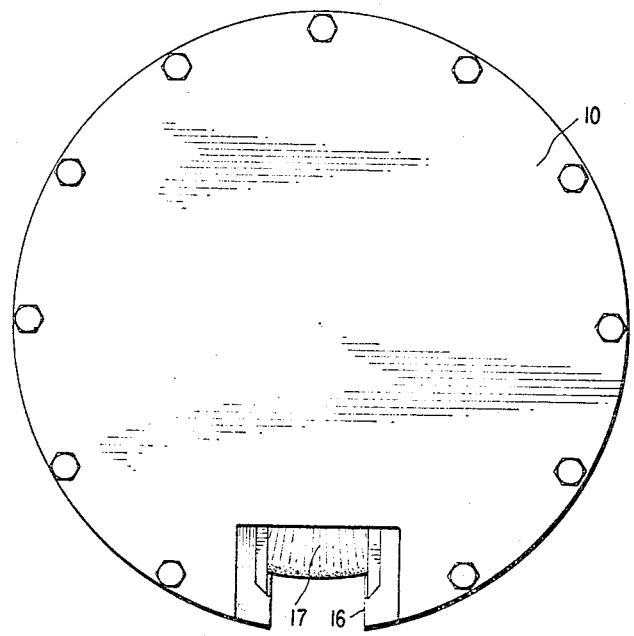
FIGURE 3 is an end elevation of the sawing machine showing the blade exposure.

In FIGURES 1 through 4, the stabilized rotary sawing machine is comprised of a pair of separable frame members 10 and 11, adapted to support a longitudinal rotatable spindle 12 on which a thin flexible saw blade 13 is mounted. The frame members are attached to a conventional circular saw frame and the spindle is driven from a suitable motor. A piece of quartz to be cut is mounted on a workholder (not shown) below the saw blade.

A nonrotatable adjustable blade face bearing 14 and a nonrotatable nonadjustable blade face bearing 15 is mounted in frame members 10 and 11, respectively. The adjustment means for bearing 14 is comprised on an internally threaded ring gear 40, adapted to be threadably engageable with a threaded portion of bearing 14, as shown in FIGURE 1, a rubber sealing ring 41, disposed between ring gear 40 and frame 10, and a pinion 42, the shaft of which extends outwardly of frame 10. Rotation of the pinion 42 causes bearing 14 to be moved toward or away from saw blade 13 so as to increase or decrease the restriction of the blade between the bearings.

A radial slot 16 extends through the frame and bearing members and opens at the edge thereof. Each of the bearing members 14 and 15 is provided with a plurality of spiral passageways 18 in the faces thereof, which radiate outwardly from and are in communication with centrally disposed chambers 19 and 20. Central chambers 19 and 20 provide a reservoir for a lubricant which is supplied thereto by means of a central lubricating fluid inlet 43, bored in frame 10 and spindle 12, as shown in FIGURE 1, and fluid distributing channels 44 and 45 which communicate between inlet 43 and chambers 19 and 20, respectively. The lubricant is then directed to the side faces of the saw blade, passing in the space between the blade and blade mounting clamps 46 and 47 to the spiral passageways 18. The lubricating fluid serves both as a lubricant and a cooling fluid during the actual cutting process.

A fluid conduit 21, shown in FIGURE 2, is bored in each bearing member 14 and 15 so that the conduit communicates between the lubricant chambers and a T-shaped groove 22, provided in the bearing face adjacent the radial slot 16, as shown in FIGURE 4. When the bearings 14 and 15 are assembled in their operating position, as shown in FIGURE 1, the T-shaped grooves 22 of each bearing face are in an opposed relation on either side of the saw blade. The grooves supply lubricant to the saw blade immediately after passing through a workpiece.

When the saw blade is rotated at speeds in excess of 3,000 r.p.m., the restriction of the saw blade in the vertical plane by the bearings 14 and 15, provides for an effective clamping of the saw blade outside the area of slot 16. This effective clamping of the thin flexible blade causes the formation of ridges or corrugations 17 in the blade surface in the unrestricted area of slot 16. The corrugations 17 cause a stiffening of the blade in the area of the slot which effectively controls and eliminates the instability of the unrestricted or partially restricted saw blades of the prior art.

Figure 5A:
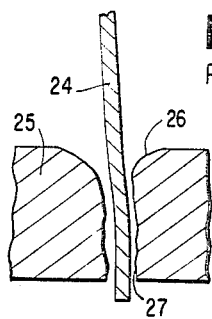
FIGURE 5A illustrates the prior art showing a cut made by an unrestricted saw blade.
Figure 5B:
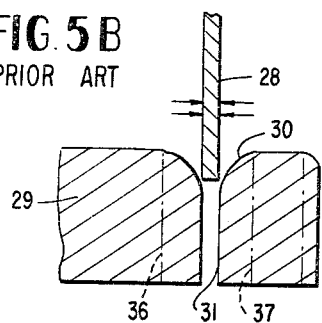
FIGURE 5B illustrates the prior art showing the cut made by a partially restricted saw blade.

Referring to FIGURES 5A and 5B, when a unrestricted saw blade 24 is applied to a workpiece 25, the unstable, flexible blade causes a canted canyon-shaped initial cut 26 and an irregular and unpredictable kerf 27 to be cut in the workpiece.

FIGURE 5B illustrates the contrast when a partially restricted flexible saw blade 28 is applied to workpiece 29. The initial cut 30 is still formed as a canyon-shaped opening, but the resulting kerf 31 cut in the workpiece is substantially straighter. In either the case of an unrestricted or partially restricted saw blade, however, a great deal of planing of lapping will be necessary in order to achieve the desired flat crystal surface illustrated by dashed lines 36 and 37 in FIGURE 5B. The substantial lapping operation causes a great deal of quartz material to be wasted before achieving a quartz crystal of desired thickness and parallelism.

Figure 6:
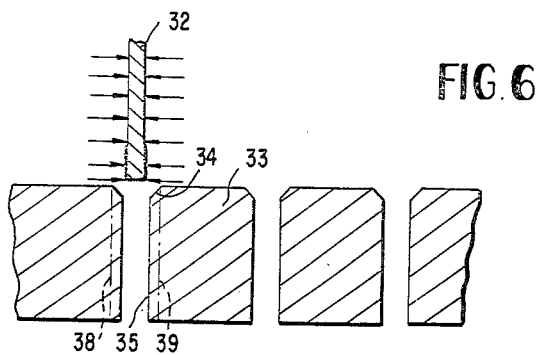
FIGURE 6 illustrates the improvement over the prior art showing a cut made by a restricted saw blade of the present invention.

FIGURE 6 shows a full face restricted flexible blade 32, similar to the blade described by the present invention, in which corrugations are formed in the vertical blade faces in the unrestricted area of the slot causing the blade to be stiffened in that exposed area. The canyon-shaped initial cut 34 is narrowed because the stiffened blade does not wander when the blade first encounters the resistance of the workpiece. Although the resulting kerf 35 is wider than the kerf formed by prior art blades, it is straighter so that only a minimum amount of lapping is necessary to achieve the flat crystal face, shown in FIGURE 6 by the dotted lines 38 and 39.

While the invention has been particularly shown and described with reference to a preferred embodiment it will be understood by those skilled in the art that various changes in form and details may be made without departing from the spirit and scope of the invention.

What is claimed is:

1. A stabilized rotary sawing machine comprising: a pair of separable frame members supporting a longitudinal rotatable spindle having a thin circular saw blade fixed thereto; an adjustable nonrotatable face bearing and a nonadjustable nonrotatable face bearing mounted in said frame members so as to restrict the side faces of said saw blade in a vertical plane, except in the area of a radial slot opening along the edge and extending through each of said frame and bearings, wherein said restriction causes the formation of corrugations in the side faces of said blade in the exposed area which stiffen said blade in said exposed area when said blade is rotated at high speed; a plurality of spiral passageways radiating outwardly in the face of each of said bearings communicating with a chamber centrally disposed of said blade supporting spindle to direct lubricant from said chamber in said passageways to said saw blade faces; and a conduit in said bearing members, communicating with said chamber and a groove in said bearing faces adjacent said slot, to direct lubricant from said chamber to said groove.

2. A stabilized rotary sawing machine as set forth in claim 1 wherein said bearing members restrict said saw blade over the entire surface of said blade side faces, except in the area of said radial slot which exposes said blade to a workpiece.

3. A stabilized rotary sawing machine as set forth in claim 1 wherein said grooves are opposed when said bearings are in the operable position so that lubrication is applied to said saw blade faces as said blade passes from the unrestricted area of said slot to the restricted area of said bearings.

References Cited

UNITED STATES PATENTS

| | | | |
|---|---|---|---|
| 2,462,710 | 2/1949 | Ballinger | 51—267 |
| 2,709,464 | 5/1955 | Kreidler | 143—160 |
| 2,842,908 | 7/1958 | Allison | 51—267 |
| 3,205,624 | 9/1965 | Weiss | 125—15 X |

HAROLD D. WHITEHEAD, Primary Examiner

U.S. Cl. X.R.

51—267